(12) United States Patent
Pawlick

(10) Patent No.: US 9,109,594 B2
(45) Date of Patent: Aug. 18, 2015

(54) RADIATOR CONFIGURATION

(76) Inventor: Daniel R. Pawlick, Toronto (CA)

( * ) Notice: Subject to any disclaimer, the term of this patent is extended or adjusted under 35 U.S.C. 154(b) by 512 days.

(21) Appl. No.: 13/590,266

(22) Filed: Aug. 21, 2012

(65) Prior Publication Data

US 2014/0056729 A1   Feb. 27, 2014

(51) Int. Cl.
| | |
|---|---|
| F01P 3/18 | (2006.01) |
| F04B 53/08 | (2006.01) |
| F04B 17/05 | (2006.01) |
| F04B 17/06 | (2006.01) |
| B60K 11/08 | (2006.01) |
| B60K 11/04 | (2006.01) |

(52) U.S. Cl.
CPC . *F04B 53/08* (2013.01); *F01P 3/18* (2013.01); *F04B 17/05* (2013.01); *F04B 17/06* (2013.01); *B60K 11/04* (2013.01); *B60K 11/08* (2013.01); *F01P 2003/182* (2013.01); *F01P 2003/185* (2013.01)

(58) Field of Classification Search
CPC ...... B60K 11/04; B60K 11/085; B60K 11/08; F01P 2003/182; F01P 2003/185; F01P 3/18; F04B 17/05; F04B 17/06; F04B 53/08
See application file for complete search history.

(56) References Cited

U.S. PATENT DOCUMENTS

| | | | |
|---|---|---|---|
| 5,317,880 A * | 6/1994 | Spears | 62/239 |
| 6,092,616 A * | 7/2000 | Burris et al. | 180/68.1 |
| 7,063,147 B2 | 6/2006 | Siebrits | |
| 7,370,690 B2 * | 5/2008 | Rasset et al. | 165/41 |
| 7,398,847 B2 * | 7/2008 | Schmitt | 180/68.4 |
| 7,788,037 B2 | 8/2010 | Soliman | |
| 7,845,413 B2 * | 12/2010 | Shampine et al. | 166/369 |
| 8,186,751 B2 * | 5/2012 | Davisdon et al. | 296/193.1 |
| 8,453,776 B2 * | 6/2013 | Neilson | 180/68.1 |
| 8,464,526 B2 * | 6/2013 | Renner | 60/431 |
| 8,960,342 B2 * | 2/2015 | Werner et al. | 180/68.1 |
| 2003/0029390 A1 * | 2/2003 | Campion | 123/2 |
| 2009/0235879 A1 * | 9/2009 | Ikeda et al. | 123/41.49 |
| 2011/0192578 A1 * | 8/2011 | Lang et al. | 165/104.34 |
| 2013/0153180 A1 * | 6/2013 | Montocchio et al. | 165/121 |
| 2014/0262147 A1 * | 9/2014 | Pawlick | 165/67 |

FOREIGN PATENT DOCUMENTS

JP          2004270570     *   9/2004

* cited by examiner

*Primary Examiner* — J. Allen Shriver, II
*Assistant Examiner* — Emma K Frick
(74) *Attorney, Agent, or Firm* — Riches, McKenzie & Herbert LLP

(57) ABSTRACT

A modular mobile fract pump unit having for a radiator with a heat exchanger vertically for generally horizontal flow of air through the radiator and a duct provided on an air exit side of the heat exchanger to direct air exiting the heat exchanger upwardly. Preferably, the duct comprises a retractable duct for movement between an operative position for use in parked cooling operation and a storage position for transport of the unit as a road worthy vehicle, within the storage position the duct not increasing the overall width of the unit and in the operative position the duct extending laterally to the side of the unit beyond the storage position and increasing the overall width of the unit.

12 Claims, 11 Drawing Sheets

RADIATOR CONFIGURATION

SCOPE OF THE INVENTION

This invention relates to modular fractoring pump units each comprising a road vehicle carrying a pump, an engine to drive the pump and radiators to cool the engine; and more particularly to a radiator configuration and arrangement for mounting the radiator on the road vehicle to permit advantageous cooling of the engine when a plurality of these road vehicles are parked side to side closely together in an array.

BACKGROUND OF THE INVENTION

Hydraulic fractoring is known as, for example, disclosed in U.S. Pat. No. 7,063,147 to Siebrits et al, issued Jun. 20, 2006 and U.S. Pat. No. 7,788,037 to Soliman, issued Aug. 31, 2010. U.S. Pat. No. 7,845,413 to Shampine, issued Dec. 7, 2010, the disclosure of which is incorporated herein by reference, teaches a typical manner of providing a plurality modular fract pumping units coupled together.

Hydraulic fractoring is a known process which requires heavy duty pumps known as fract or fractoring pumps which typically comprise high pressure pumps operating on typically diesel generators generating in the range of 2000 horsepower. A large number of such pumps are generally provided in an array to provide the necessary high pressure and large volume of fluids required for hydraulic fractoring at a remote location. The pumps are known to be provided as part of a modular mobile fract pump unit comprising a road compatible vehicle such as a customized flat bed trailer on which there is mounted the pump, an internal combustion engine to drive the pump and a radiator to cool the engine. The trailers of each unit are typically parked close together in an array side by side with the pump and a typically rigid discharge outlet for the pump at a rear end of the unit and the radiator at a front end of the unit. A central manifold can be provided for coupling of the rigid discharge outlet of each modular mobile fract pump unit at set spaced locations along a central manifold trunk moved towards or away from the manifold trunk. Each modular mobile fract pump unit when accurately located relative the manifold trunk can independently be coupled to the manifold or removed for replacement. The manifold trunk establishes a set spacing of the trailers of the units in the array side by side as, for example, on 11.5 foot (138 inches) centers. For the modular mobile fract pump unit to be road worthy on Interstate highways in the USA, the unit preferably has a width not greater than 8.5 feet (102 inches). With, for example, 11.5 foot centers for the pump discharge outlets, this provides for a 3 feet (36 inch) spacing between the sides of adjacent side by side units.

The internal combustion engine on each mobile fract pump unit typically is a diesel engine. Each diesel engine requires a large radiator to cool the engine. Known radiator structures often provide for two heat exchangers. Prior art devices such as the fractoring system shown in U.S. Pat. No. 7,845,413 to Shampine illustrate horizontally disposed radiators for air flow vertically therethrough. The horizontally disposed radiators extend horizontally for air flow vertically therethrough with the air to pass firstly upwardly through a lower heat exchanger and then secondly upwardly through an upper heat exchanger above the lower heat exchanger. This stacked upper and lower heating exchanger configuration has been selected typically to provide the cooling requirements for the engine within the maximum width for the vehicle unit to be road worthy on Interstate highways in the USA. The stacked upper and lower heating exchanger configuration has the disadvantage that atmospheric air is heated by passing through the lower heat exchanger before the heated air flows upwardly through the second heat exchanger, thus reducing the cooling capacity of the second heat exchanger. As well, the stacked upper and lower heating exchanger arrangement renders it different to clean each heat exchanger after use.

BACKGROUND OF THE INVENTION

To at least partially overcome these disadvantages of previously known devices, the present invention provides a modular mobile fract pump unit having for a radiator with a heat exchanger vertically for generally horizontal flow of air through the radiator and a duct provided on an air exit side of the heat exchanger to direct air exiting the heat exchanger upwardly. Preferably, the duct comprises a retractable duct for movement between an operative position for use in parked cooling operation and a storage position for transport of the unit as a road worthy vehicle, within the storage position the duct not increasing the overall width of the unit and in the operative position the duct extending laterally to the side of the unit beyond the storage position and increasing the overall width of the unit. Preferably, the duct is provided with cleaning access doors opening therethrough which can be opened to access the radiator for cleaning. Preferably, a pair of radiators are provided, one along on each side of the vehicle, with the ducts opening outwardly.

Preferably, a roof member may be provided to bridge laterally between two radiators proximate the top of the radiators. A fan is provided on the interior of each radiator to direct flow laterally outwardly through each radiator. With the roof member in place, the roof member requires air to be passed through the radiators to be drawn laterally from the front or rear or below the radiators reducing the likelihood that heated air discharged vertically from each duct may be drawn down into the fan and passed again through the radiator.

Vehicles carrying radiators in accordance with the present invention can be parked relatively close together side by side as, for example, within three feet of each other in which the case the ducts would extend to one side, about eighteen inches so that the ducts effectively meet.

As the radiators preferably have a substantial height and size, to provide for manual closing of the ducts, an arrangement is provided which permits a person on the ground to open and close the radiators avoiding the need to climb the unit and dangers associated therewith. Access doors are provided laterally of the unit through each duct which, preferably when each duct is in a closed position, can be opened by a person on the ground to facilitate the radiators being cleaned as in a known manner by the passage of water through the heat exchangers.

In one aspect, the present invention provides a modular mobile pump unit comprising:

an elongate mobile trailer having a first side, a second side, a front and a rear, the trailer having a longitudinal centerline between the first side and the second side, the longitudinal center line dividing a first deck portion and a second deck portion, the trailer having mounted thereon a pump to dispense a fluid, an internal combustion engine to power the pump, a first air cooled radiator to cool the engine and a second air cooled radiator to cool the engine, the first radiator comprising a vertically extending first heat exchanger for passage of air horizontally therethrough to cool a fluid from the engine circulated within the first heat exchanger and a first fan to blow atmospheric air through the first heat exchanger, the first radiator mounted to the trailer on the first deck portion proximate the first side with the first heat exchanger adjacent the first side and with the first fan laterally inwardly of the first heat exchanger, the first fan providing for passage of air through the first heat exchanger horizontally and laterally outwardly toward the first side of the trailer, the first radiator having, a first duct member carried on the first radiator at a location laterally outwardly of the first heat exchanger and in the flow path of air from the first fan exiting horizontally and laterally from the first heat exchanger, the first duct member movable relative to the first radiator from a storage position in which the first duct member does not extend laterally outwardly beyond the first side of the trailer and an operative position in which the first duct member extends laterally outwardly beyond the first side of the trailer, in the operative position the first duct member receiving air passing laterally from the first heat exchanger and directing this air to exit vertically upwardly from a first duct outlet disposed along an upper edge of the first duct member, the second radiator comprising a vertically extending second heat exchanger for passage of air horizontally therethrough to cool a fluid from the engine circulated within the second heat exchanger and a second fan to blow atmospheric air through the second heat exchanger, the second radiator mounted to the trailer directly opposite the first radiator on the second deck portion proximate the second side with the second heat exchanger adjacent the second side and with the second fan laterally inwardly of the second heat exchanger, the second fan providing for passage of air through the second heat exchanger horizontally and laterally outwardly toward the second side of the trailer, the second radiator having a second duct member carried on the second radiator at a location laterally outwardly of the second heat exchanger and in the flow path of air from the second fan exiting horizontally and laterally from the second heat exchanger, the second duct member movable relative to the second radiator from a storage position in which the second duct member does not extend laterally outwardly beyond the second side of the trailer and an operative position in which the second duct member extends laterally outwardly beyond the second side of the trailer, in the operative position the second duct member receiving air passing laterally from the second heat exchanger and directing this air to exit vertically upwardly from a second duct outlet disposed along an upper edge of the second duct member. Preferably, the invention provides an array of such units wherein the units are arranged side by side with a spacing between adjacent units at least equal to a spacing distance represented by the sum of a distance that the first duct member in the operative position extends beyond the first side of the trailer and a distance that the second duct member in the operative position extends beyond the second side of the trailer.

BRIEF DESCRIPTION OF THE DRAWINGS

Further aspects and advantages of the present invention will become apparent from the following description taken together with the accompanying drawings in which.

DETAILED DESCRIPTION OF THE DRAWINGS

Figure 1:
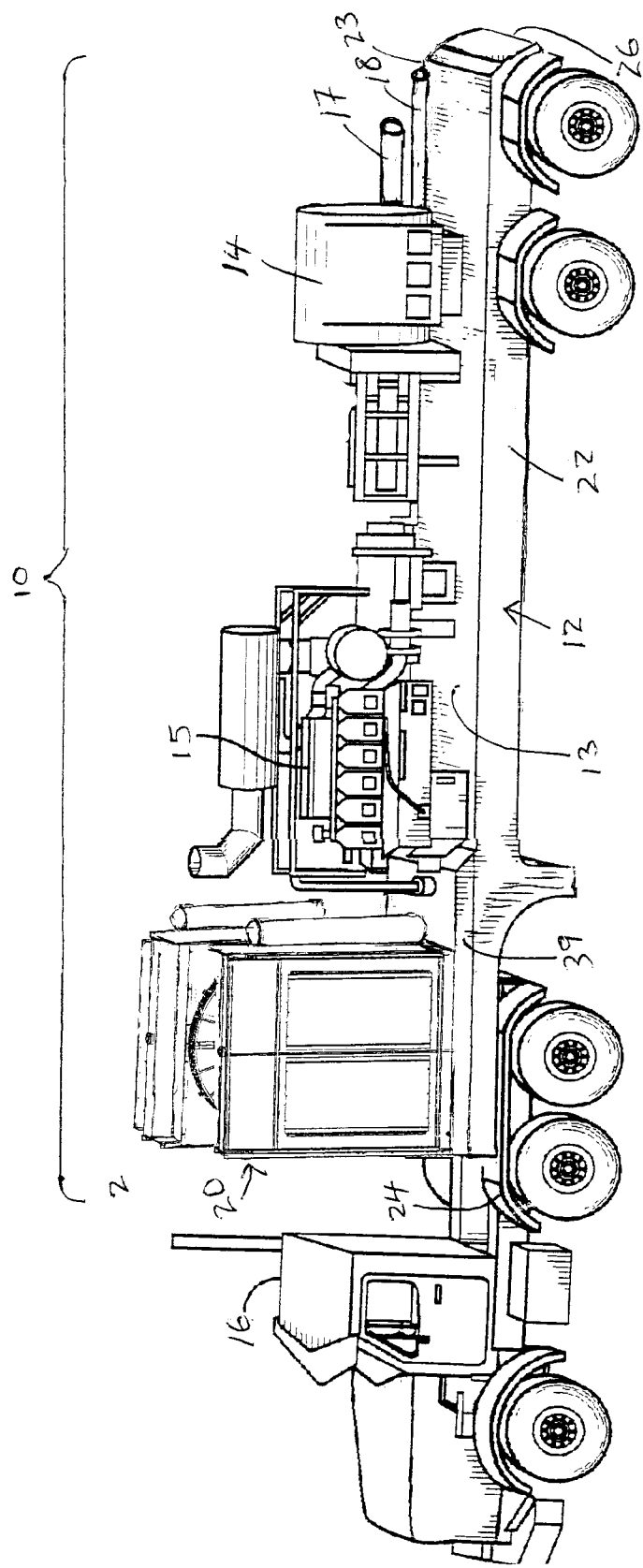
FIG. 1 is a perspective rear view of a modular mobile pump unit in accordance with the present invention in conjunction with a tractor.

FIG. 1 shows a modular pump mobile unit 10 in accordance with the present invention. The mobile 10 comprises a standard trailer 12, a fluid pump 14, a diesel motor 15 that drives the pump 14 and a pair of radiators 20 and 21 for cooling the diesel motor 15. The trailer 12 is removably coupled to a tractor 16 for ease of transportation. The pump 14 has a intake pipe 17 for receiving fluid at a low pressure and a discharge pipe 18 for discharging fluid at a high pressure.

Figure 10:
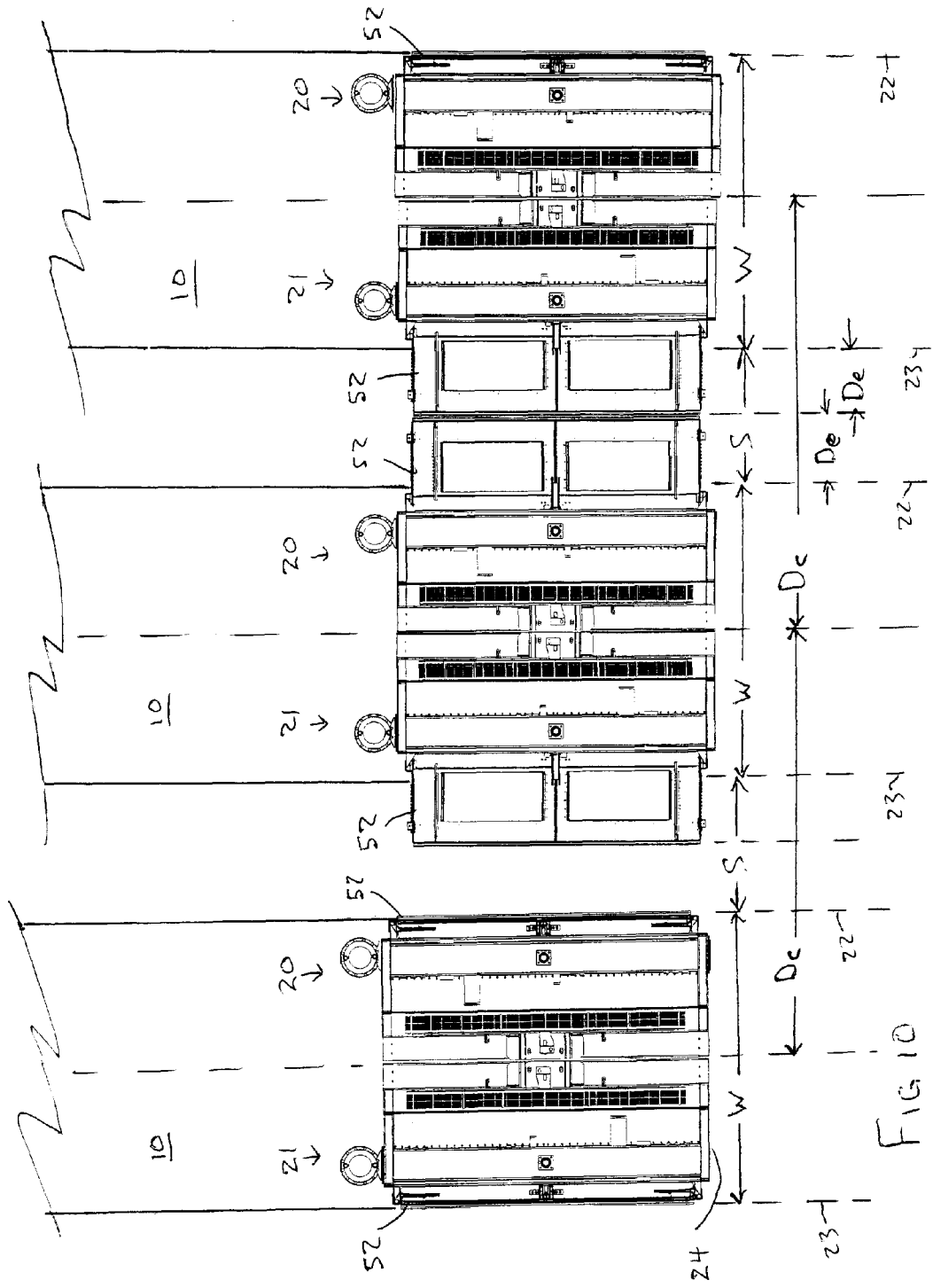
FIG. 10 is an enlarged view of the front portions of three of the units shown in FIG. 9 showing the units as being spaced an equal distance apart.

The unit 10 and the trailer 12 have a first side 22, a second parallel side 23, a front 24 and a rear 26. As seen in FIG. 10, the unit 10 and the trailer 12 have a longitudinal center line 27 which extends longitudinally of the unit 10 and the trailer 12 between the first side 22 and the second side 23, and divides the trailer 12 into a first deck portion and a second deck portion. The first deck portion is between the longitudinal center line 27 and the first side 22. The second deck portion is between the longitudinal center line 27 and the second side 23.

Figure 9:
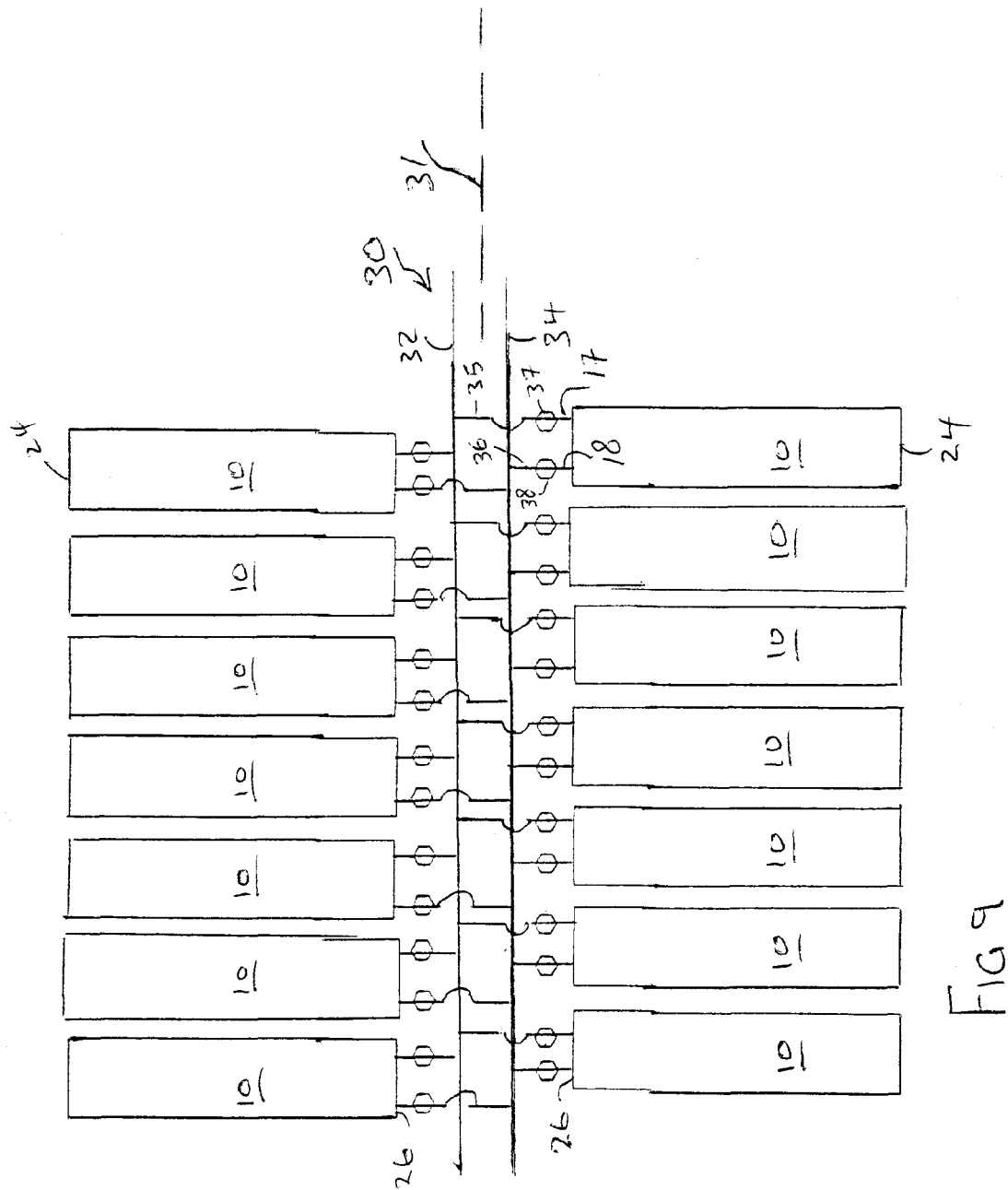
FIG. 9 is a schematic top view showing a plurality of units in accordance with FIG. 1 arranged in two rows, one on either side of a central manifold.

Referring to FIG. 9, an array of mobile modular units 10 is arranged on opposite sides of a fluid manifold 30. The manifold 30 extends along a manifold longitudinal 31. The manifold includes a low pressure liquid line 32 and a high pressure discharge line 34. The intake pipe 17 from each unit 10 is adapted to be removably coupled to a corresponding outlet pipe 35 of the low pressure liquid line 32 and the discharge pipe 18 of each unit 10 is adapted to be removably coupled to a corresponding inlet pipe 36 of the high pressure discharge line 34. The low pressure liquid line 32 has the outlet pipe 35 located at equally spaced fixed distances along the longitudinal 31 of the manifold. The high pressure discharge line 34 has the inlet pipes 36 located at correspondingly spaced fixed distances along the longitudinal 31 of the manifold 30. Each inlet pipe 36 includes a valve 37 and each outlet pipe includes a valve 38 to selectively independently permit or prevent flow. Each unit 10 is preferably located with its longitudinal center line 27 perpendicular to the longitudinal 31 of the manifold 30. Each mobile unit 10 may be disconnected from the manifold 30 and independently moved forwardly or rearwardly for replacement by another modular unit 10.

As can be seen in FIG. 1, the trailer 12 has a deck 13 including a skid portion 39 upon which the radiators 20 and 21 are schematically shown as being mounted. For ease of illustration, in each of FIGS. 2 to 5, the radiators are shown as mounted on the skid 39 without illustrating other components of the unit 10.

Figure 6:
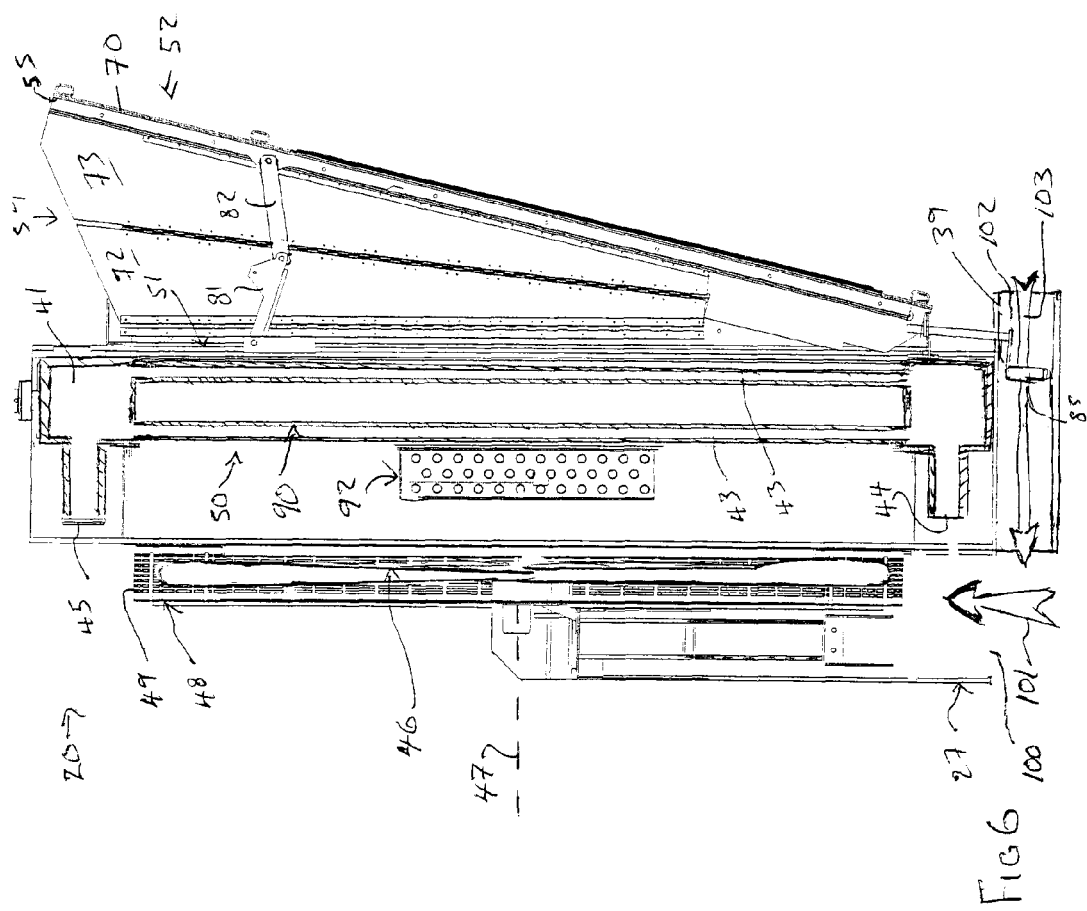
FIG. 6 is a schematic cross-sectional front view along section line 6-6' in FIG. 4 showing the right hand side radiator.

Reference is made to FIG. 6 which is a schematic cross-sectional view along section line 6-6' of the first radiator 20. The first radiator 20 has a first heat exchanger 40. The first heat exchanger 40 includes a top header 41 and a bottom header 42 with a core 90 of vertically extending cooling tubes 43 extending vertically between the top header 41 and the bottom header 42. A fluid inlet 44 delivers fluid from the cooling system of the motor 15 to the bottom header 42. A fluid outlet 45 is connected to the top header 41 and delivers cooled fluid from the top header 41 back to the cooling system of the motor 15. Thus, cooling fluid from the motor 15 is to be circulated in a cooling circuit, only part of which is shown, to pass from the fluid inlet 44 into the bottom header 42 vertically through the cooling tubes 43 to the top header 41 and then out the fluid outlet 45 to return to the engine. As will be appreciated, a suitable circulating pump (not shown) is provided to circulate the cooling fluid through the first heat exchanger 40.

The first radiator 20 includes a system for passing atmospheric air through the core of the first heat exchanger past the cooling tubes 43 so as to reduce the temperature of the cooling fluid circulated through the cooling tubes 43. In this regard, as schematically shown in FIG. 6, a fan 46 is rotatable about a horizontal fan axis 47 within a cylindrical fan casing 48 so as to draw atmospheric air inwardly through openings 49 in the fan casing and force the air horizontally and laterally outwardly through the core 90 and past the cooling tubes 43. As seen in FIG. 6, the fan 46 directs air flow laterally outwardly in a direction from the longitudinal center line 27 laterally outwardly toward the first side 22. In this regard, the first heat exchanger 40 may be considered to have an air inlet opening 50 on the laterally inward side of the cooling tubes 43 and an air outlet opening 51 on a radially outwardly side of the cooling tubes 43.

The first radiator 20 has a first duct member 52 which in FIG. 6 is illustrated as being in an operative position permitting air flow from the fan 46 laterally outwardly through the air outlet opening 51 and then upwardly through the duct member 52 to exit upwardly through a first duct outlet 54 open to the atmosphere. As seen in FIG. 6, the first duct outlet 54 is disposed along an upper edge 55 of the first duct member 52.

Each of the first radiator 20 and the second radiator 21 has identical components and each is located on a respective side of the longitudinal center line 27 of the trailer 12, on the first deck portion and the second deck portion, respectively. The radiators 20 and 21 can be virtually identical but for arrangements so as to be suitably located adjacent either the first side 22 or the second side 23. For ease of discussion, each of the individual elements of the second radiator 21 will be referred to by the same reference numerals used to refer to the elements of the first radiator 20.

Figure 2:
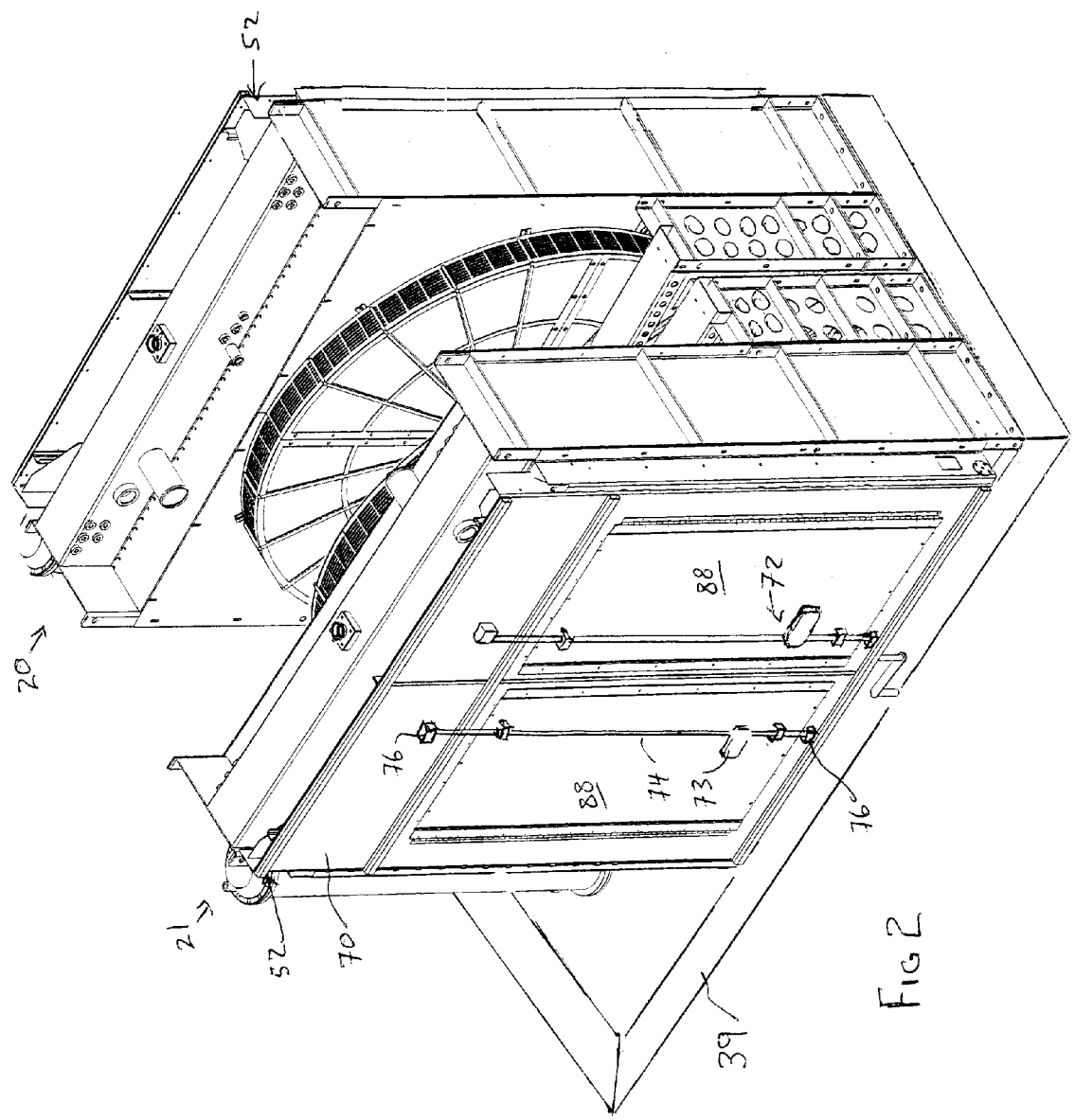
FIG. 2 is a schematic front perspective view of a skid platform and the radiators shown in FIG. 1 in a storage position.
Figure 3:
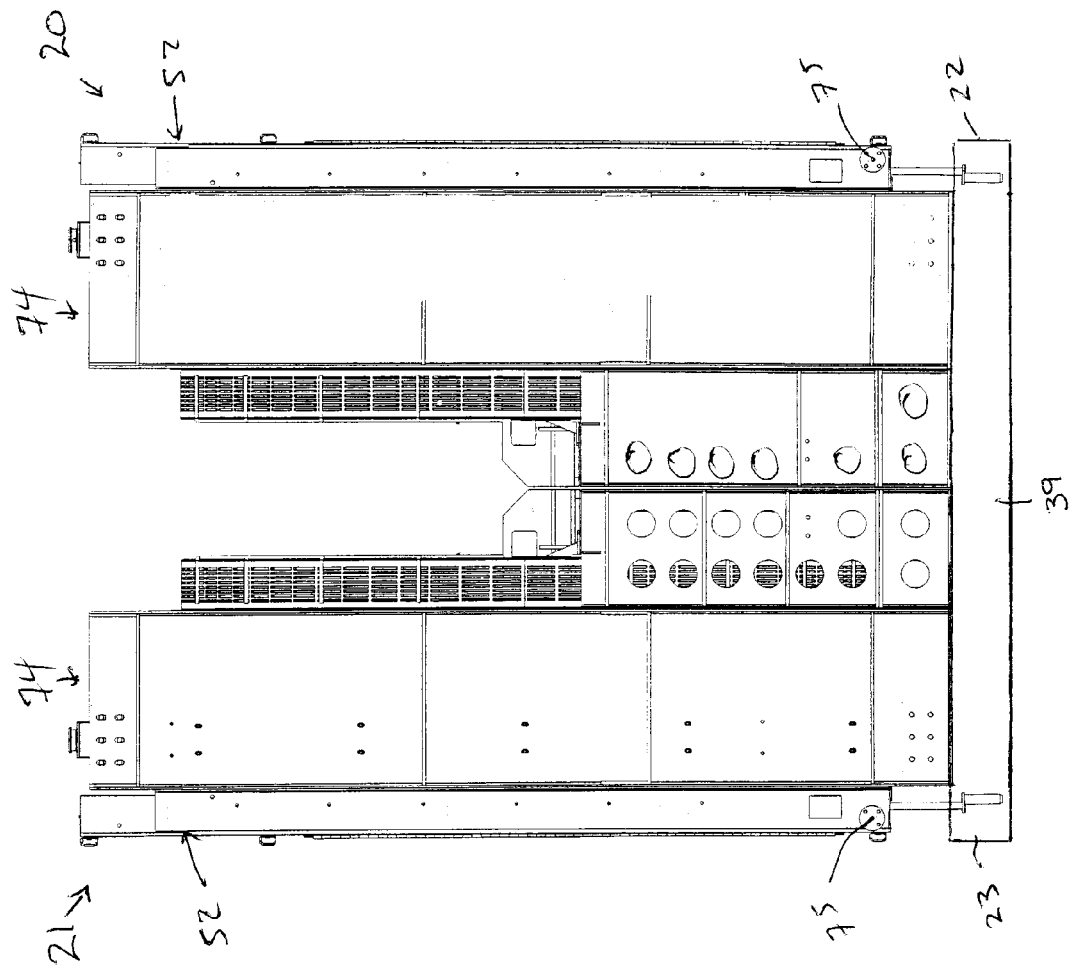
FIG. 3 is a front view of FIG. 2.
Figure 4:
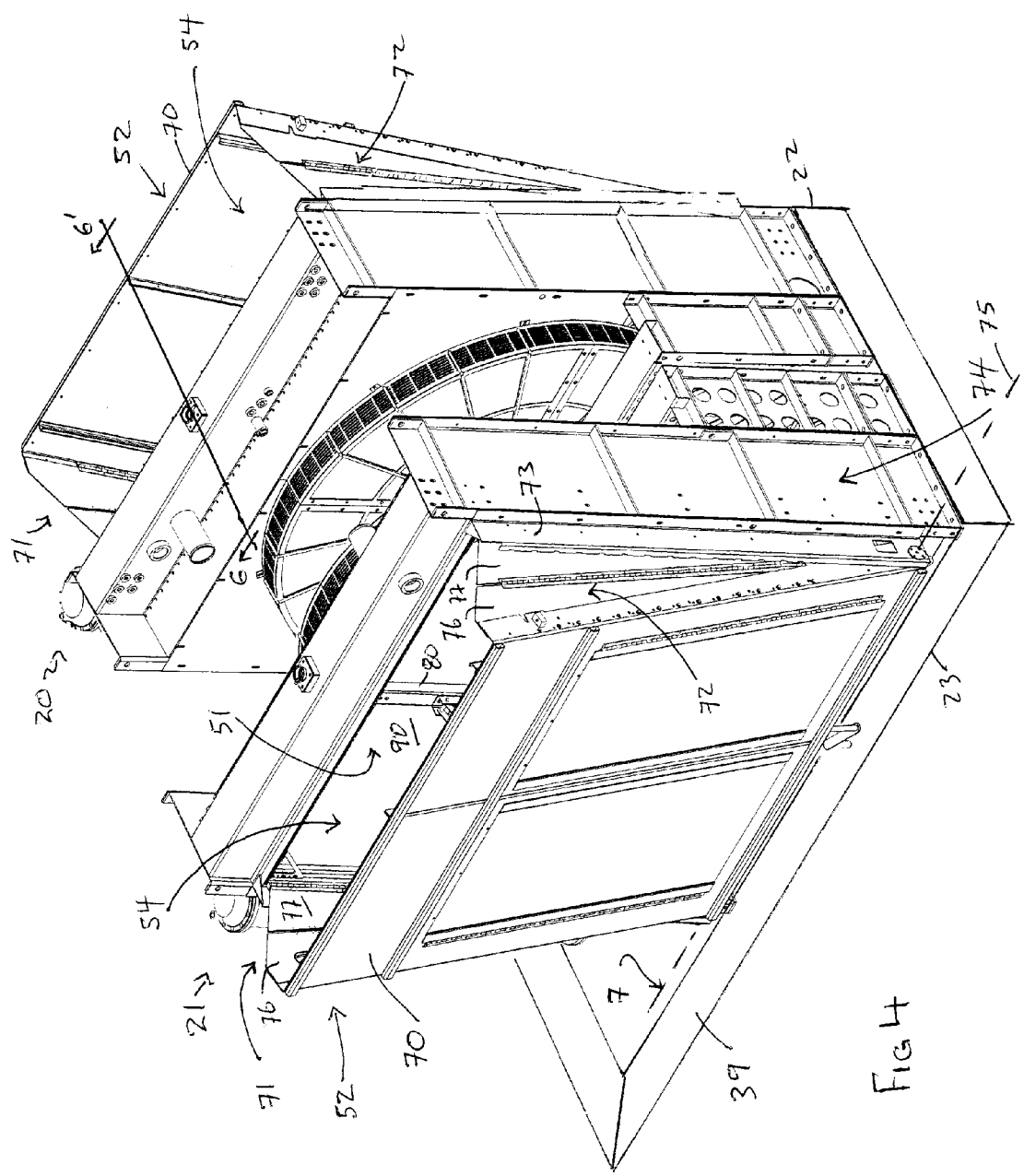
FIG. 4 is a schematic front perspective view the same as FIG. 2 but showing the radiators in an operative position.
Figure 5:
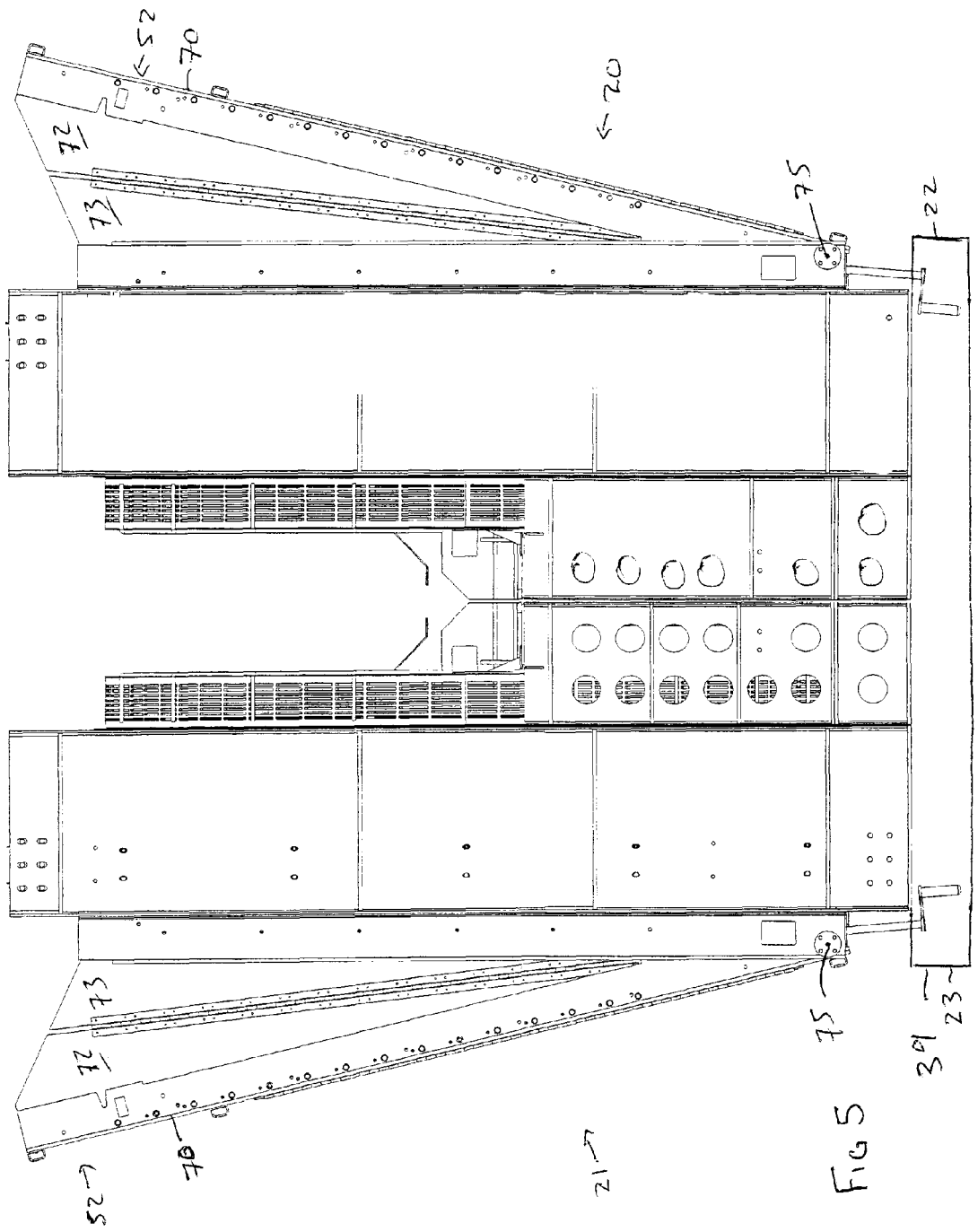
FIG. 5 is a front view of FIG. 4.

The duct member 52 of the radiators 20 and 21 are movable between operative positions as shown in FIGS. 4 and 5 which permit air flow upwardly from the duct outlets 54 and storage positions as shown in FIGS. 2 and 3 which substantially close the air outlets 51. As seen in end view in FIG. 3, with the radiators 20 and 21 and the duct members 52 in the storage position, the radiators 20 and 21 do not extend outwardly beyond the trailer first side 22 or the second side 23. In contrast, as seen in end view in FIG. 5, in the operative position, the duct members 52 extend laterally beyond the sides of the trailer, with the duct member 52 of the first radiator 20 extending beyond the trailer first side 22 and the duct member 52 of the second radiator 21 extending beyond the second side 23.

Reference is made to FIG. 10 which is a schematic enlargement of front portions of three units 10 shown in FIG. 9 arranged side to side and in which the left hand-most trailer is shown with its radiators 20 and 21 having their duct members 52 in the storage position, the middle unit 10 is shown as having its radiators 20 and 21 with its duct members 52 in the operative position and the right hand unit 10 is illustrated as having its second radiator 21 with its first duct member 52 in an operative position and its first radiator 20 having its duct member 52 in a storage position. In FIG. 10, the width of each unit 10 is illustrated as W with a width of each of the three units 10 being indicated as identical. The center line 27 for each unit 10 is shown and the distance between center lines, $D_c$ is shown and is indicated as being identical. The units 10 are shown as arranged side by side with a spacing between units indicated as S and which such spacing S being represented as equal to two times the distance $D_e$ that duct member 52 extends laterally from the respective side of its respective unit 10. In a preferred embodiment as illustrated in FIGS. 9 and 10, the inlet pipes 36 for the high pressure discharge line 34 and the outlet pipes 35 for the low pressure fluid line 32 may be spaced along the manifold longitudinal 31 a distance equal to $D_c$ shown in FIG. 10. Preferably, the distance $D_c$ is equal to the width W of a trailer plus at least twice $D_e$ the distance that each duct member 52 extends from a trailer. Such an arrangement provides for optimal usage of the spacing between units 10 for discharge of air upwardly. Preferably, the width of a trailer is a maximum width which permits the trailer to be roadworthy, for example, 102 inches. Preferably, the distance $D_c$ is in the range of 12 to 24 inches, preferably 18 inches and the units 10 as well as the outlet pipes 35 and the inlet pipes 36 are spaced a distance of $D_c$ of about 138 inches.

Reference is made to FIG. 4 which illustrates a preferred configuration for each duct member 52. The duct member 52 has a side wall 70, a front wall 71 and a rear wall 72. The side wall 70 is mounted to a rectangular frame 73 of a casing 74 for each radiator that contains the heat exchanger 40 and provides the passageway for air flow. The frame 73 effectively defines the air outlet opening 51 for passage of air laterally outwardly through the core and its cooling tubes 43. The duct member 52 is pivotally mounted to the frame 73 for pivoting at its lower end about a horizontal axis generally indicated as 75. Each of the front wall 71 and the rear wall 72 is formed from two triangular gusset members 76 and 77, each mounted by hinge members extending along the edges of each gusset member such that with pivoting of the side wall 70 about the horizontal axis 75, the gusset members fold inwardly upon themselves in a manner not dissimilar to that of a pleat in an accordion.

Figure 7:
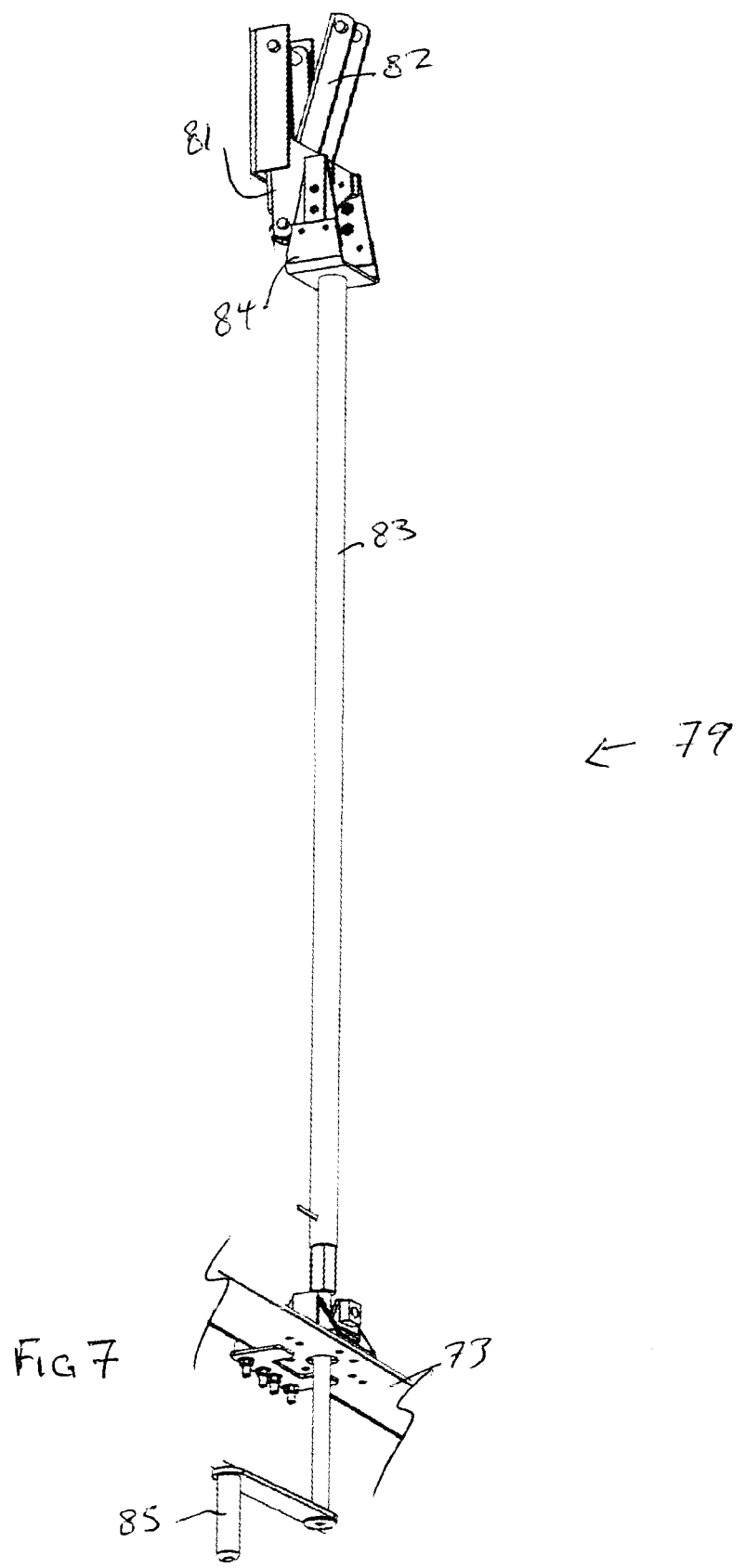
FIG. 7 is a schematic perspective view illustrating a mechanism for movement of the duct member between the storage position and the operative position.

An actuator member 79 is provided for moving each of the duct members 52 between the operative position and the storage position. As seen in FIGS. 4 and 6, a vertical strut 80 is mounted to the frame 73 and pivotally carries a first pivot arm 81 which is pivotably coupled to a second pivot arm 82 pivotably coupled to the center of the side wall 70. As illustrated in FIG. 7, the actuator mechanism includes a rotatable rod 83 which is mounted to a lower portion of the frame 73 and extends upwardly to an actuator link 84 engaging the first pivot arm 81. With rotation of a crank handle 85, shown in FIG. 7, the actuator link 84 is moved upwardly or downwardly and thus pivots the first and second pivot arms so as to move the duct member 52 toward the operative position by moving the pivot arms upwardly and to move the duct member 52 toward the storage position by moving the pivot arms downwardly.

The crank handle 85 is located at a height on the unit 10 to be accessible by a person standing on the ground without the need for the person to climb the unit 10 or its trailer 12. The crank handle 85 is to be provided so as to avoid interference in use with other portions of the unit 10 such as the trailer 12 or the skid 39 albeit, in the embodiments for ease of illustration, the crank handle 85 appears to be in interference with the skid 39. As can be seen in FIG. 4, with the side wall 70 in the operative position, the duct outlet 54 is open upwardly to the atmosphere for discharge of air upwardly.

Figure 8:
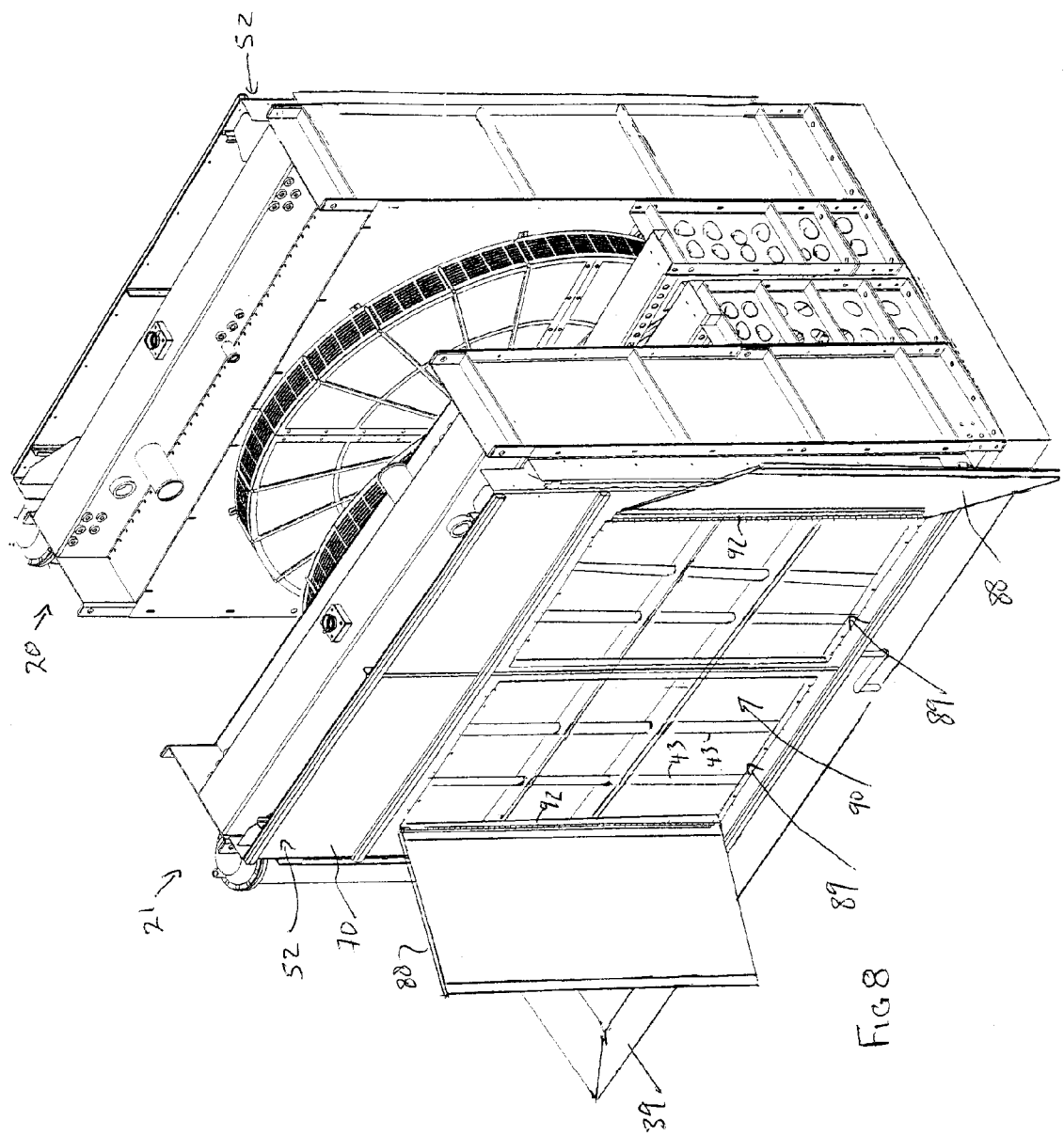
FIG. 8 is a perspective view the same as FIG. 2 but showing access doors in an open position.

Reference is made to FIG. 8 which illustrates the duct members 52 in a closed position, however, with access doors 88 on the duct member 52 shown as being in an open position. As seen in FIG. 8, the side wall 70 of each duct member 52 is provided with two rectangular access openings 89 therethrough. An access door 90 is provided coupled by a vertically extending hinge 92 to an edge of each access opening 89. The access doors 88 are movable from a closed position as shown in FIG. 2 which closes the side wall 70 to air flow therethrough and an open position as shown in FIG. 8 in which the access doors provide access to the heat exchanger 40 therein and, more particularly, to the core of the heat exchanger and the cooling tubes 43. With the access doors 88 in the open position as shown in FIG. 8, a person on the ground can access the core 90 and its cooling tubes 43 for cleaning as, for example, with a user to hold a hose to discharge a stream of air or water to engage the core and its cooling tubes 43 to clean the outside of the cooling tubes from various matters such as dust, dirt, mud and the like which may have come to be engaged upon the cooling tubes during use and typically which impedes efficient heat transfer. Of course, the core and its cooling tubes 43 may have various cooling fins 70 which may be placed close together and from which debris such as dust, dirt and mud may preferably be removed in cleaning on a regular basis to maintain the efficiency of the heat exchanger. FIG. 8 schematically shows four vertically extending cooling tubes 43 and two longitudinally extending cooling fins 70 although a large number typically are to be provided.

The access doors 88 are located on the radiators 20 and 21 at a location that a person standing on the ground can manually move the access doors between the open and closed positions and to latch the doors in the open and closed positions. Various latching arrangements may be used as they are accessible from the ground and are used, for example, to close the doors at the rear of box trailers and the like. A latching arrangement 72 is schematically illustrated in FIG. 2 only. Vertically extending lock rod 73 rotatably supported on each door 88 and pivotable by a handle 74 between coupled and uncoupled conditions with cam latches 75 and 76 carried on the front wall 70 above and below each door 88 and are of the type disclosed in U.S. Pat. No. 2,038,876 to Sonabend, issued Apr. 28, 1936. The handle 74 is accessible to a person on the ground. Once unlatched, each door 88 is accessible to a person on the ground to pivot each door between open and closed positions.

In the preferred embodiments, the heat exchangers are shown with a core which has vertically extending cooling tubes 43. In accordance with the invention, it is not necessary that the cooling tubes 43 extend vertically. For example, in a similar heat exchanger, the cooling tubes may extend horizontally. Referring to FIG. 6, in addition to the primary core 90 having vertically extending cooling tubes 43, a secondary core 91 is shown schematically to have horizontally extending cooling tubes 92.

In the preferred embodiment, the trailer first side 22 and the trailer second side 23 are shown as providing substantially in the same vertical plane, a laterally most extending surface of the unit 10, the trailer 12, the trailer deck 13, its skid 39 and each of the radiators 20 and 21. It is to be appreciated that a unit 10 with the duct members 52 in the storage position, the unit 10 will have a width defined by a laterally outermost surface. The laterally outermost surface may comprise the side wall 70 of one of the radiators with, for example, the skid 39 or the trailer deck 13 or the portions of the trailer disposed laterally inwardly therefrom.

In the preferred embodiment, the duct member 52 is illustrated to assume an operative position in which the duct member 52 extends laterally from the unit 10 farther in the operative position than in a storage position. The particular configuration of the duct member 52 is not limited. The preferred duct member 52 illustrated hinges about the horizontal hinge axis 75 at the bottom of the duct member 52. This is not necessary. The duct member 52 could be provided to merely slide laterally to one side and, for example, to extend in the operative position farther laterally outwardly over its whole height than when in the storage position.

The duct member 52 is shown as having its front wall 71 and its rear wall 72 formed from gusset members which fold to collapse upon themselves when a duct member 52 is moved to the storage position. This is not necessary and each of the front wall 71 and the rear wall 72 could be rigid members which slide laterally into slots provided on the radiator of a casing 74. Similarly, rather than provide the front wall 71 and the rear wall 72 from rigid gusset members, each wall could be provided as from a flexible member as, for example, from a flexible elastomeric member or fabric.

Figure 11:
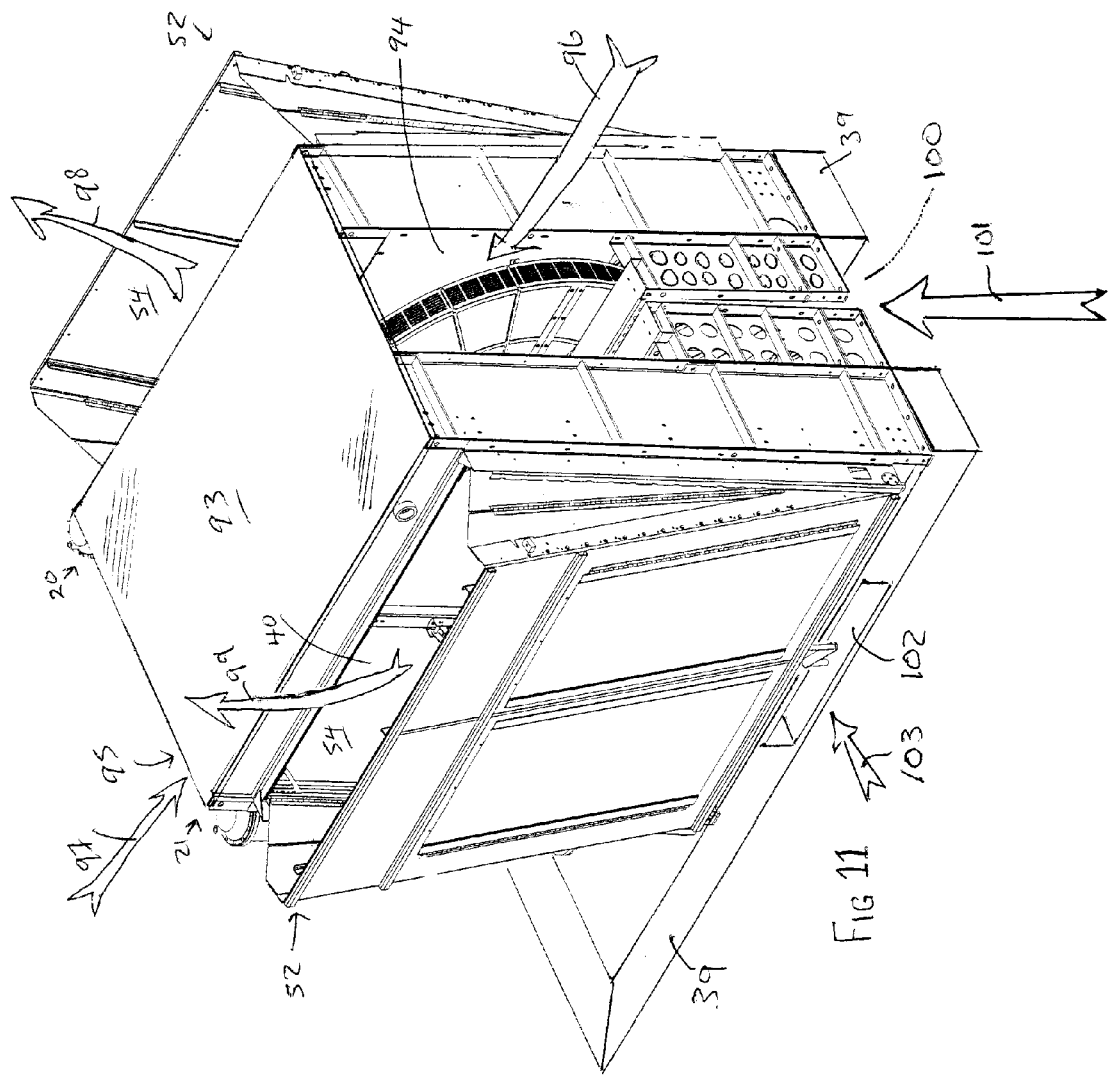
FIG. 11 is a perspective view the same as FIG. 4 but additionally showing a roof baffle.

Reference is made to FIG. 11 which illustrates a second embodiment in accordance with the present invention and which is identical to the first embodiment with the first exception that a roof member 93 is provided bridging between the first radiator 20 and the second radiator 21 laterally inwardly of the duct outlet 54 on each side of the unit 10 and above the fans 46 and their fan casings 48. Between the casing 74 enclosing each heat exchanger 40, and beneath the roof member 93, a forward air inlet 94 and rear air inlet 95 is provided via which atmospheric air may be drawn into the fan as indicated by the arrows 96 and 98. Air drawn into the fans 46 is directed through the heat exchangers 40 to exit upwardly from the duct outlets 54 as indicated by the arrows 98 and 99. Providing the roof member 93 assists in reducing the likelihood that heated air exhausted upwardly from the duct outlets is drawn back into the fans.

FIG. 11 differs from the first embodiment in showing schematically a bottom air inlet 100 provided through the skid portion 39 and which permits air from below the deck 39 of the trailer 12 into the fan 46 as indicated by arrow 101. The bottom air inlet 100 can be accommodated with suitable ducting or apertures through the skid portion 39 and deck underneath the fans 46. FIG. 11 further shows as also shown schematically in FIG. 6 the deck 39 to be cut away under the fan 46 to provide the bottom air inlet 100 and permit air flow upwardly as indicated by arrow 100. FIGS. 11 and 6 also show one lower horizontal air inlet 102 shown to be formed internally within the deck 39 to permit air flow horizontally from the side as indicated by arrow 103 to the fan 46. The lower horizontal air inlet 102 may be provided, one on each side, whether or not a bottom air inlet 100 is provided.

While the invention has been described with reference to the preferred embodiments, many variations and modifications will now occur to a person skilled in the art. For a definition of the invention, reference is made to the accompanying claims.

I claim:

1. A modular mobile pump unit comprising:
an elongate mobile trailer having a first side, a second side, a front and a rear,
the trailer having a longitudinal centerline between the first side and the second side, the longitudinal center line dividing a first deck portion and a second dock portion,
the trailer having mounted thereon a pump to dispense a fluid, an internal combustion engine to power the pump, a first air cooled radiator to cool the engine and a second air cooled radiator to cool the engine,
the first radiator comprising a vertically extending first heat exchanger for passage of air horizontally therethrough to cool a fluid from the engine circulated within the first heat exchanger and a first fan to blow atmospheric air through the first heat exchanger,
the first radiator mounted to the trailer on the first deck portion proximate the first side with the first heat exchanger adjacent the first side and with the first fan laterally inwardly of the first heat exchanger, the first fan providing for passage of air through the first heat exchanger horizontally and laterally outwardly toward the first side of the trailer,
the first radiator having a first duct member carried on the first radiator at a location laterally outwardly of the first heat exchanger and in the flow path of air from the first fan exiting horizontally and laterally from the first heat exchanger,
the first duct member movable relative to the first radiator from a storage position in which the first duct member does not extend laterally outwardly beyond the first side of the trailer and an operative position in which the first duct member extends laterally outwardly beyond the first side of the trailer,
in the operative position the first duct member receiving air passing laterally from the first heat exchanger and directing this air to exit vertically upwardly from a first duct outlet disposed along an upper edge of the first duct member,
the second radiator comprising a vertically extending second heat exchanger for passage of air horizontally therethrough to cool a fluid from the engine circulated within the second heat exchanger and a second tan to blow atmospheric air through the second heat exchanger,
the second radiator mounted to the trailer directly opposite the first radiator on the second deck portion proximate the second side with the second heat exchanger adjacent the second side and with the second fan laterally inwardly of the second heat exchanger, the second fan providing for passage of air through the second heat exchanger horizontally and laterally outwardly toward the second side of the trailer,
the second radiator having a second duct member carried on the second radiator at a location laterally outwardly of the second heat exchanger and in the flow path of air from the second fan exiting horizontally and laterally from the second heat exchanger,
the second duct member movable relative to the second radiator from a storage position in which the second duct member does not extend laterally outwardly beyond the second side of the trailer and an operative position in which the second duet member extends laterally outwardly beyond the second side of the trailer,
in the operative position the second duct member receiving air passing laterally from the second heat exchanger and directing this air to exit vertically upwardly from a second duet outlet disposed along an upper edge of the second duct member.

2. The unit as claimed in claim 1 wherein:
the first duct member extends vertically throughout the height of the first heat exchanger locating the first duct outlet at a height substantially the same as uppermost portions of the first heat exchanger, and
the second duct member extends vertically throughout the height of the second heat exchanger locating the second duet outlet at a height substantially the same as uppermost portions of the second heat exchanger.

3. The unit as claimed in claim 2 including:
a roof baffle member bridging laterally between the first radiator and the second radiator above the first fan and the second fan at a height below the first duct outlet and the second duct outlet,
the baffle member limiting the direct flow of air discharged upwardly from the first duct outlet and the second duct outlet downwardly into the first fan and the second fan.

4. The unit as claimed in claim 3 wherein:
a front air entrance way is defined between the first radiator and the second radiator below the roof baffle member for passage of atmospheric air rearwardly to the first fan and the second fan,
a rear air entrance way is defined between the first radiator and the second radiator below the roof baffle member for passage of atmospheric air forwardly to the first fan and the second fan.

5. The unit as claimed in claim 3 including at least one of:
a front air entrance way is defined between the first radiator and the second radiator below the roof baffle member for passage of atmospheric air rearwardly to the first fan and the second fan,
a rear air entrance way is defined between the first radiator and the second radiator below the roof baffle member for passage of atmospheric air forwardly to the first fan and the second fan,
a bottom air entranceway is defined for passage of atmospheric air from below the trailer upwardly through the trailer to the first fan and the second lint,
a first lower air entranceway is defined for passage of atmospheric air from below the first radiator from the first side laterally inwardly and underneath the first radiator to the first fan, and
a second lower air entranceway is defined, for passage of atmospheric air from below the second radiator from the second side laterally inwardly and underneath the second radiator to the second fan.

6. The unit as claimed in claim 2 including:
at least one first access door through the first duct member movable between a closed position and an open position, wherein with the first duct member in the storage position and the first access door in the open position the first access door providing access from the first side of the trailer to the first heat exchanger for cleaning; and
at least one second access door through the second duct member movable between a closed position and an open position, wherein with the second duct member in the storage position and the second access door in the open position the second access door providing access from the second side of the trailer to the second heat exchanger for cleaning.

7. The unit as claimed in claim 6 wherein:
the first heat exchanger having an air flow passageway for air flow therethrough from a laterally inwardly located first air inlet opening to a laterally outwardly located first air outlet opening,
in the operative position the first duct member receiving air from the first air outlet opening of the first heat exchanger and directing the air to exit vertically upwardly from the first duct outlet,
the first duct member in the storage position with the first access door closed extends across the first air outlet opening of the first heat exchanger closing the first air outlet opening,
the second heat exchanger having an air flow passageway for air flow therethrough from a laterally inwardly located second air inlet opening to a laterally outwardly located second air outlet opening,
in the operative position the second duct member receiving air from the second air outlet opening of the second heat exchanger and directing the air to exit vertically upwardly from the second duct outlet,
the second duct member in the storage position with the second access door closed extends across the second air outlet opening of the second heat exchanger closing the second air outlet opening.

8. An array of the units as claimed in claim 6 including a first latching mechanism accessible by a person on the ground to latch and unlatch the first access door; and
a second latching mechanism accessible by a person on the ground to latch and unlatch the second access door.

9. An array of the units as claimed in claim 2 including a first mechanism operative by a person on the ground to move the first duct member between the storage position and the operative position; and
a second mechanism operative by a person on the ground to move the second duct member between the storage position and the operative position.

10. An array of the units as claimed in claim 1 wherein the units are arranged side by side with a spacing between adjacent units at least equal to a spacing distance represented by the sum of a distance that the first duct member in the operative position extends beyond the first side of the trailer and a distance that the second duct member in the operative position extends beyond the second side of the trailer.

11. The array of units as claimed in claim 10 wherein the spacing between adjacent units is substantially equal to the spacing distance.

12. The array of units as claimed in claim 10 in combination with to manifold having a plurality of inlet pipes, located longitudinally along the manifold an equal distance equal to at least the width of each trailer between the first side and the second side plus the spacing between adjacent units,
the pump of each unit having a discharge pipe adapted to be removably coupled to the inlet pipes of the manifold,
each mobile unit having its rear located proximate the manifold and its front remote from the manifold,
each unit being independently removably coupled to the manifold and independently movable forwardly away from the manifold for replacement by another similar modular unit.

\* \* \* \* \*